US006947991B1

(12) United States Patent
Burton et al.

(10) Patent No.: US 6,947,991 B1
(45) Date of Patent: Sep. 20, 2005

(54) METHOD AND APPARATUS FOR EXPOSING NETWORK ADMINISTRATION STORED IN A DIRECTORY USING HTTP/WEBDAV PROTOCOL

(75) Inventors: Daniel Paul Burton, Eagle Mountain, UT (US); Chris Andrew, Highland, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/394,590

(22) Filed: Sep. 13, 1999

(51) Int. Cl.[7] .......................................... G06F 15/16
(52) U.S. Cl. .................. 709/227; 709/203; 709/206; 709/221; 709/223; 709/225; 709/226; 709/245; 707/10; 707/102; 707/200
(58) Field of Search ................. 709/206, 226, 709/203, 221, 223, 225, 245, 227; 707/10, 707/102, 200; 370/431

(56) References Cited

U.S. PATENT DOCUMENTS

| | | | | |
|---|---|---|---|---|
| 5,761,669 A | * | 6/1998 | Montague et al. | 707/103 |
| 5,884,298 A | * | 3/1999 | Smith, II et al. | 707/2 |
| 6,192,405 B1 | * | 2/2001 | Bunnell | 709/225 |
| 6,195,097 B1 | * | 2/2001 | Shrader et al. | 345/356 |
| 6,269,380 B1 | * | 7/2001 | Terry et al. | 707/200 |
| 6,289,378 B1 | * | 9/2001 | Meyer et al. | 709/223 |
| 6,308,179 B1 | * | 10/2001 | Petersen et al. | 707/102 |
| 6,308,205 B1 | * | 10/2001 | Carcerano et al. | 709/221 |
| 6,327,608 B1 | * | 12/2001 | Dillingham | 709/203 |
| 6,351,748 B1 | * | 2/2002 | Deen et al. | 707/10 |
| 6,351,776 B1 | * | 2/2002 | O'Brien et al. | 709/245 |
| 6,449,633 B1 | * | 9/2002 | Van et al. | 709/203 |
| 6,629,127 B1 | * | 9/2003 | Deen et al. | 709/203 |

OTHER PUBLICATIONS

"WebDAV: Evolving the Web into a Read and Write Medium", msdn online Web Workshop, Inverview with Jim Whitehead posted Apr. 7, 1999, http://msdn.mcrosoft.com/workshop/standards/webdave.asp, Jun. 25, 1999.

* cited by examiner

Primary Examiner—Bharat Barot
Assistant Examiner—ThuHa Nguyen
(74) Attorney, Agent, or Firm—Haynes and Boone, LLP

(57) ABSTRACT

A method and system to manipulate network objects by using Internet authoring, collaboration and versioning tools is described. The method includes: receiving a request for a manipulation of a first network object from a requesting user; verifying a first set of authorization information; translating a logical address of the first network object to a physical file system path; checking a local file system for validity and authorization for the requesting user including determining whether the first network object is a first network object; verifying a username and a password for the requesting user; returning a first error message if requesting user is unauthorized to access the first network object; determining an object type for the first network object; and sending a response to the requesting user. The method can also include verifying that the first network object is found and returning a second error message if the first network object is not found. The first network object can be user object and the request can be to assign new rights to the user object. The new rights for the user can also be for another network object. The new rights can be assigned by dragging and dropping the user object on another network object by the use of interactive computer screen.

42 Claims, 4 Drawing Sheets

METHOD AND APPARATUS FOR EXPOSING NETWORK ADMINISTRATION STORED IN A DIRECTORY USING HTTP/WEBDAV PROTOCOL

BACKGROUND OF THE INVENTION

The invention relates generally to computers and, more particularly, to a system and method to extend Web content tools to network administrative services.

A very popular Web (Internet) content tool, or protocol, is WebDAV. WebDAV stands for Web Distributed Authoring and Versioning and is currently being developed by the Internet Engineering Task Force. Simply stated, the WebDAV protocol makes the Web a collaborative, writeable medium. Today the Web is really read-only, where people mostly download information. WebDAV makes it possible for web users wherever they are, whether separated by two houses or two continents, to write, edit and save shared documents without scuttling each other's work, regardless of which software program or Internet service they are using.

But, WebDAV goes beyond just Web page authoring. When you look under the hood, WebDAV is a set of extensions to the Hypertext Transfer Protocol (HTTP), which is the standard protocol that allows Web browsers to talk to Web servers. WebDAV and HTTP can accommodate all kinds of content, and so WebDAV can be used just as easily to collaboratively work on a word processing document, a spreadsheet, or an image file. Anything you can store in a file can potentially be authored using WebDAV, gaining its advantages.

WebDAV has three main features: overwrite prevention, properties, and namespace management. Overwrite prevention is critical because it allows people to avoid the "lost update problem" that occurs as changes to a document are lost when several authors access and attempt to edit a file at the same time. By ensuring that people can work together without losing their changes, overwrite prevention is the key to WebDAV's collaboration support.

WebDAV's properties feature is an efficient means of storing and retrieving what is known as "metadata"—information about a web document such as the author's name, copyright, publication date and keywords that Internet search engines use to find and retrieve relevant documents. Finally, WebDAV also has what's called "namespace management" capabilities, which enables users to conveniently manage Internet files and directories, including the ability to move and copy files. The process is similar to the way word-processing files and directories are managed on a regular computer.

In regards to network administration tools, several tool sets exist on the market today. Among those tool sets, the most widely used product on the market is Novell Directory Services by Novell, Inc. However, other tool sets such as Active Directory by Microsoft based and others based on Lightweight Directory Access Protocol also exist.

Novell Directory Services (NDS) is a portfolio of network administrative tools and a product of Novell, Inc. Novell Directory Services, often referred to as a full service directory, is a general-purpose database that manages discovery, security, storage, and relationships.

Discovery enables you to browse, search, and retrieve specific information from the directory. For example, you can search for specific object types, such as, users, printers, and application objects, or search their specific properties such as users name, phone number, address, network number and so on. Discovery must support the industry standard access methods, for example, the Lightweight Directory Access Protocol (LDAP) protocol.

Security controls access to the all the information that is stored in the directory. This means that you can establish rules and grant rights to the users for the information in the directory. In addition, you can control the flow of information within your company, across networks of partners, and even your customers. Using the full service directory, you can manage the electronic transactions between companies through the cryptographic and key management systems. More specifically, the Public Key Infrastructure (PKI) available in NDS today provides security for Internet data integrity and privacy across public networks. It includes both public-key cryptography and digital certificates for checking the authenticity of keys used in a public session.

Storage is the database structure for the directory. It gives you the basic ability to save information in the database for future reference. The database is indexed, cached, and guarded from data corruption by a transaction system. Besides merely storing data, the database allows you to automatically control the type of data by applying classifications to the data structures. The classifications are flexible and extensible to provide future representations in the database. The database can be split into physical pieces and distributed or placed on multiple servers. These features enable you keep a portion of the data close to the users and resource that need them and make multiple copies of the data for redundancy.

Relationship is the ability to build associations between the people, network devices, network applications, and information on the network. For example, instead of storing the user's profile information on the local machine, it can be stored in NDS. The result is that the profile information becomes global within the scope of the directory and the user can access the profile information from anywhere. This means that the user receives the same profile regardless of where he attaches and logs in to the network. In addition, the access to the profile information is tightly controlled. The only user that can gain access is the one with the proper credentials. Thus, the integrity of profile information is protected and secure, and the user can access it globally-easily.

The other network administration tool sets have similar features. Although the combination of a network administration tool set and the WebDAV protocol would provide access to network directory structure through a platform independent architecture, no real combination exists today. If a combination existed, any operating system that has a WebDAV enabled web browser can have access to the network administration functions.

Therefore, what is needed is an invention that combines both a network administration portfolio with the WebDAV protocol.

SUMMARY OF THE INVENTION

In contrast to the prior art, the present invention provides a method and system for extending the WebDAV protocol to network administration tool sets. To this end, the system and method include modifications to the set of normal method requests for WebDAV in order for the protocol to also manipulate network objects.

One of the benefits of the invention is efficient administration of user rights through the internet without requiring software to be installed on client. Another benefit is that the system allows users to control rights to their personal data without requiring software to be installed on the client. This advantage will also reduce the workload on network administrators. Another advantage is the ability to browse to resources such as printers connected on the internet. Yet another advantage is that the system enables developers to create network administration tool set enabled applications using the standard WebDAV protocol.

In addition, the method can include: receiving a request for a manipulation of a first network object from a requesting user; verifying a first set of authorization information; translating a logical address of the first network object to a physical file system path; checking a local file system for validity and authorization for the requesting user including determining whether the first network object is a first network object; verifying a username and a password for the requesting user; returning a first error message if requesting user is unauthorized to access the first network object; determining an object type for the first network object; and sending a response to the requesting user. The method can also include verifying that the first network object is found and returning a second error message if the first network object is not found. The first network object can be user object and the request can be to assign new rights to the user object. The new rights for the user can also be for another network object. The new rights can be assigned by dragging and dropping the user object on another network object by the use of interactive computer screen.

Therefore, in accordance with the previous summary, objects, features and advantages of the present invention will become apparent to one skilled in the art from the subsequent description and the appended claims taken in conjunction with the accompanying drawings.

DETAILED DESCRIPTION OF THE PREFERRED EMBODIMENTS

The present invention is described with several examples given below. It is understood, however, that the examples below are not necessarily limitations to the present invention, but are used to describe typical embodiments of operation. In particular, although the Novell Directory Services (NDS) is used for the preferred embodiment, it is to be understood that the invention could also be implemented with any number of the other network administration tool sets.

Figure 1:
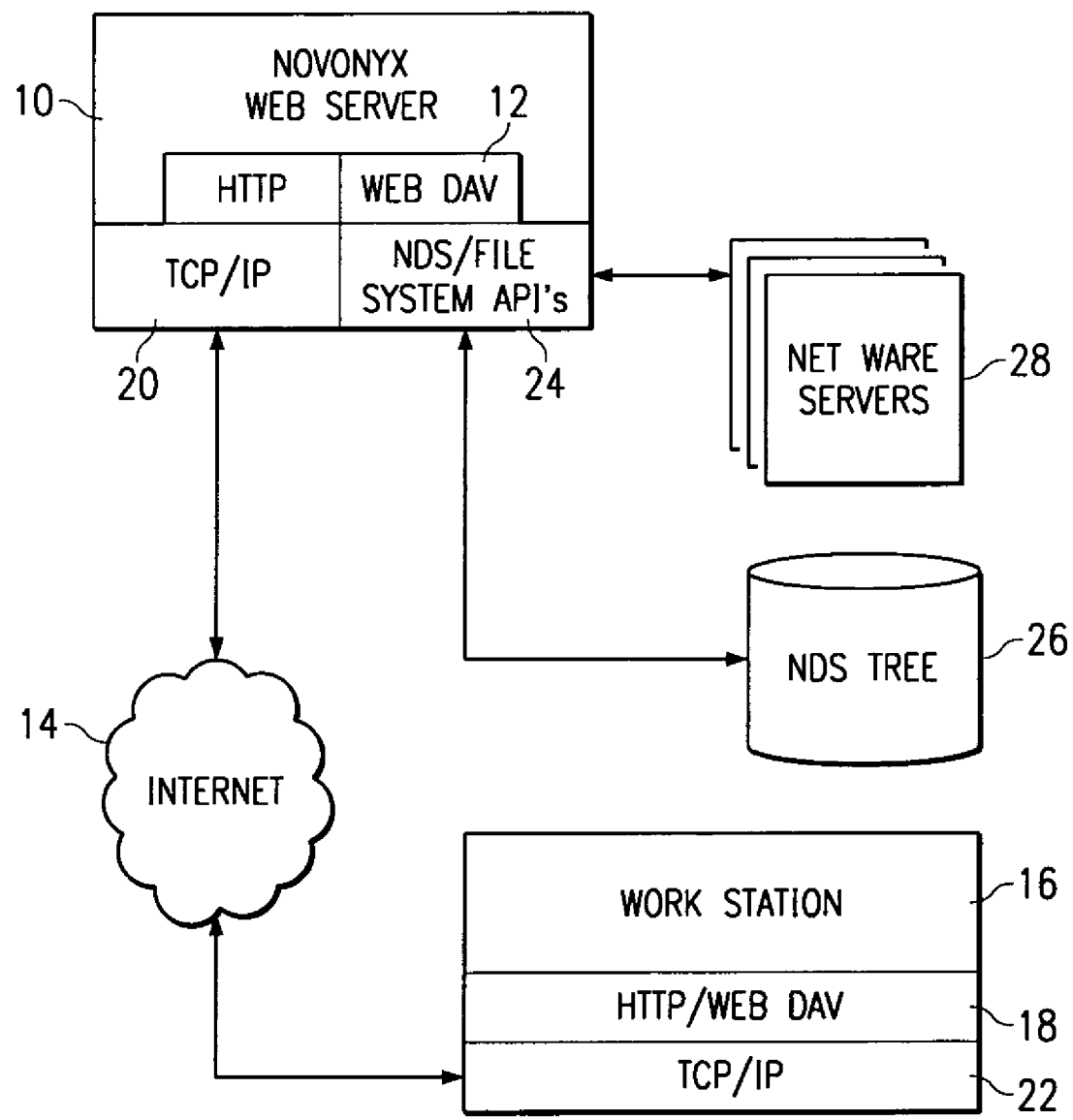
FIG. 1 is a diagram that illustrates the elements and relationships involved in the preferred embodiment.

Referring to FIG. 1, a Novonyx Web Server 10 is shown. The Novonyx Web Server 10 is a Netscape Server that has been ported to run on NetWare servers. WebDAV and HTTP are shown as blocks 12 to illustrate the HTTP/WebDAV plug-in within the Novonyx Web Server that uses the normal method of handling HTTP request by passing them through a Request-Response process. The message requests themselves are sent via the Internet 14 from a Work Station 16 that also has a HTTP/WebDAV module 18. Both the Novonyx Web Server 10 and the Work Station 16 have TCP/IP modules 20 and 22 respectively, to illustrate the communication connection through the Internet 14.

The NDS and File System API's module 24 provides the method that Novonyx Web Server communicates to the NDS Tree 26 and the other NetWare Servers 28. While NDS DAV is the bridge between NDS and the WebDAV protocol, NDS DAV is written as a Netscape Server (NS) API extension to the Novonyx Web Server. NSAPI provides the mechanism for an extension to replace all or parts of the Request-Response process. The steps in the Request-Response process are described in more detail below.

Figure 2:
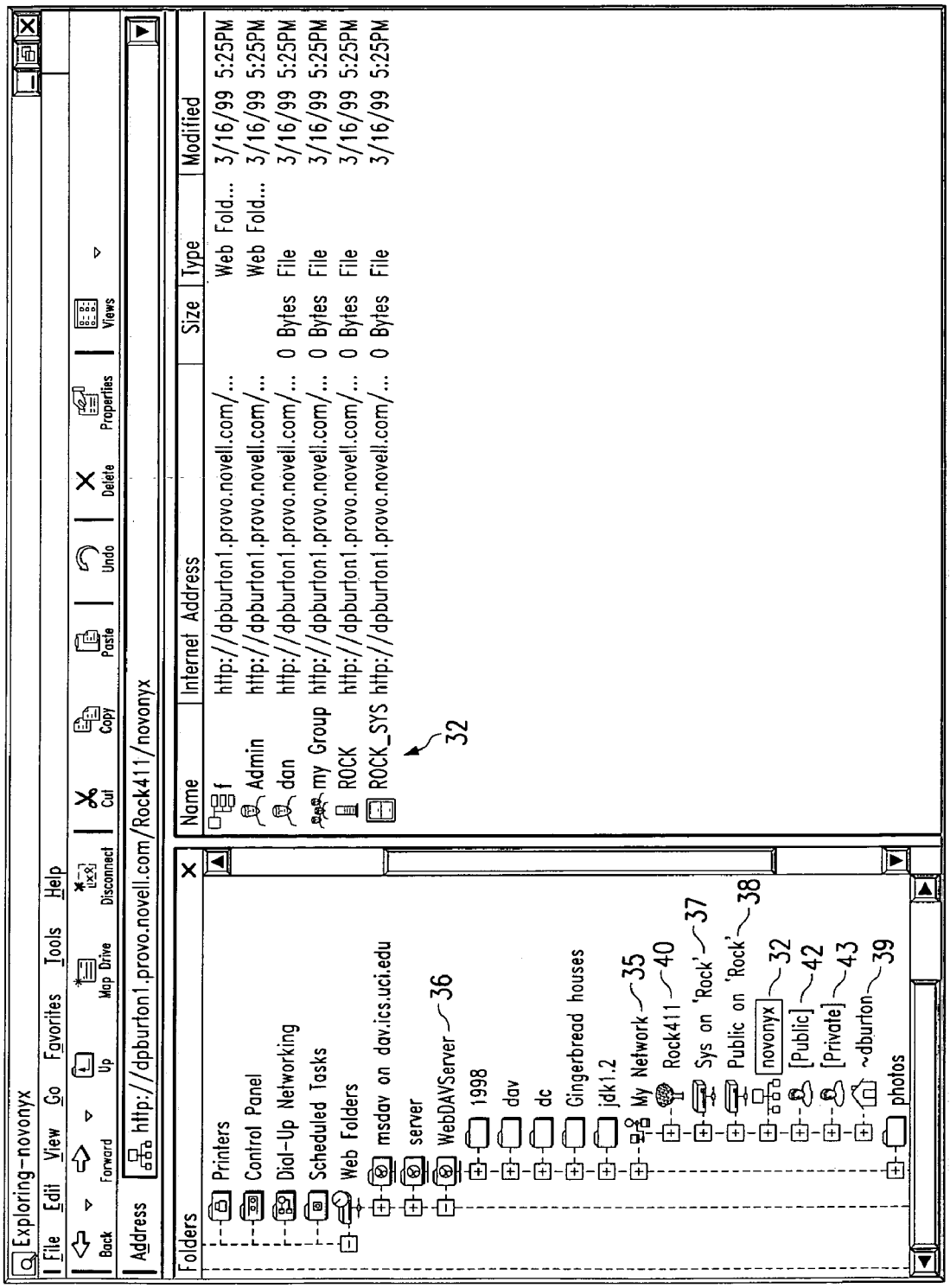
FIG. 2 is an example computer screen that illustrates an example in the preferred embodiment.

FIG. 2 shows what an example screen 30 looks like. The screen shows a view of an Organizational Unit 32 in the my Network folder 35. The screen 30 also shows how easy it would be to drag and drop the object Dan on a folder, file or printer object, to assign Dan new NDS rights to that object. The details of the assignment of new rights is detailed below.

Now, a few examples of what can be implemented with the invention. The My Network folder 35 provides a central location on the NetWare server from which to get to the rest of the network resources that are used. Unlike the Network Neighborhood folder seen in MS Windows, this folder actually exists on the NetWare server instead of the workstation. This folder is also accessed via industry standard web protocols. Because of these special qualities, you can access the My Network folder from any workstation that is attached to the public internet—anywhere in the world.

Within the My Network folder 35, a personalized version of the following items are shown: mapped drive web folders 37, 38; a personal web publishing folder 39; a my directory tree web folder 40; and a my organizational unit web folder 32.

Now referring to the mapped drive web folders 37, 38, if the network administrator set up the mapped network drives so that they normally visible at the client, those same directories will be shown as web folders within the My Network folder 35. This will allow the user to access his corporate applications and data remotely without the need for a Novell client on his workstation. However, the Windows and DOS applications that require traditional drive mappings will probably not work in this environment.

When an user's login account gets created on a Novell network, the network administrator will normally create a home directory (user directory) for the user on the network. If the network administrator enabled the User Home Directories feature, the user's My Network folder contains a link to the user's personal web publishing directory 39.

For example, if the user's home directory is on \\MyServer\Data\Users\Bob, then the user's personal web publishing folder will be called ~BOB and actually contains all the HTML files that the user publishes in the \\MyServer\Data\Users\Bob\public_html subdirectory. Please note that the user can control who can access his web publishing folders by dragging and dropping users and groups from his NDS directory web folders onto those folders.

The My Directory Tree Web folder 40 allows the user to see the contents of his Novell Directory Services tree. In particular, the user can see all the users and groups that have been defined within his network. To view the properties of any shown object, the user double clicks its icon within the web folder.

However, the network administrator will likely allow the user to only modify the properties of his own user object and modify rights for his personal web publishing folders. The rights to other users, groups and web folders are usually controlled by the network administrator.

The user's organizational unit web folder 32 contains users that represent all of the colleagues in the user's department as well as any groups of users that the network administrator may have defined. The users and groups found within this folder also includes the special users [Public] 42 and [Private] 43. The users and groups within this web folder can be used to modify the access rights on the web folders or any other areas in which the network administrator has given the user access control rights.

Furthermore, the display of the [Public] 42 and the [Private] 43 objects facilitate adding or subtracting all rights. To add all rights to all users, a user would drag the object (he would have to have full rights to the object) and drop it on the [Public] object 42. Conversely, if the user wanted to take all rights for the object from the other users, he would drag the object and drop it on the [Private] object 43.

However, please note that although MS Windows currently limits a user to drag and drop only objects onto folders and not vice versa, the present invention is not restricted to MS Windows or to such a limitation. On the contrary, the architecture and methods of the present invention does not have any restrictions regarding the dragging and dropping of objects or folders.

In addition, the invention can also work with Microsoft's Office 2000 Start Page. The Office 2000 Start Page allows Office2000 users to view the web folders on a NetWare Server, as well as to search and discuss the documents that have been published there. The user can just click on Office 2000 icon to navigate to the start page that is installed on his NetWare server. However, the present invention would work similarly with other products like Microsoft's Office 2000 and is not meant to be limited to the Microsoft products.

Figure 3:
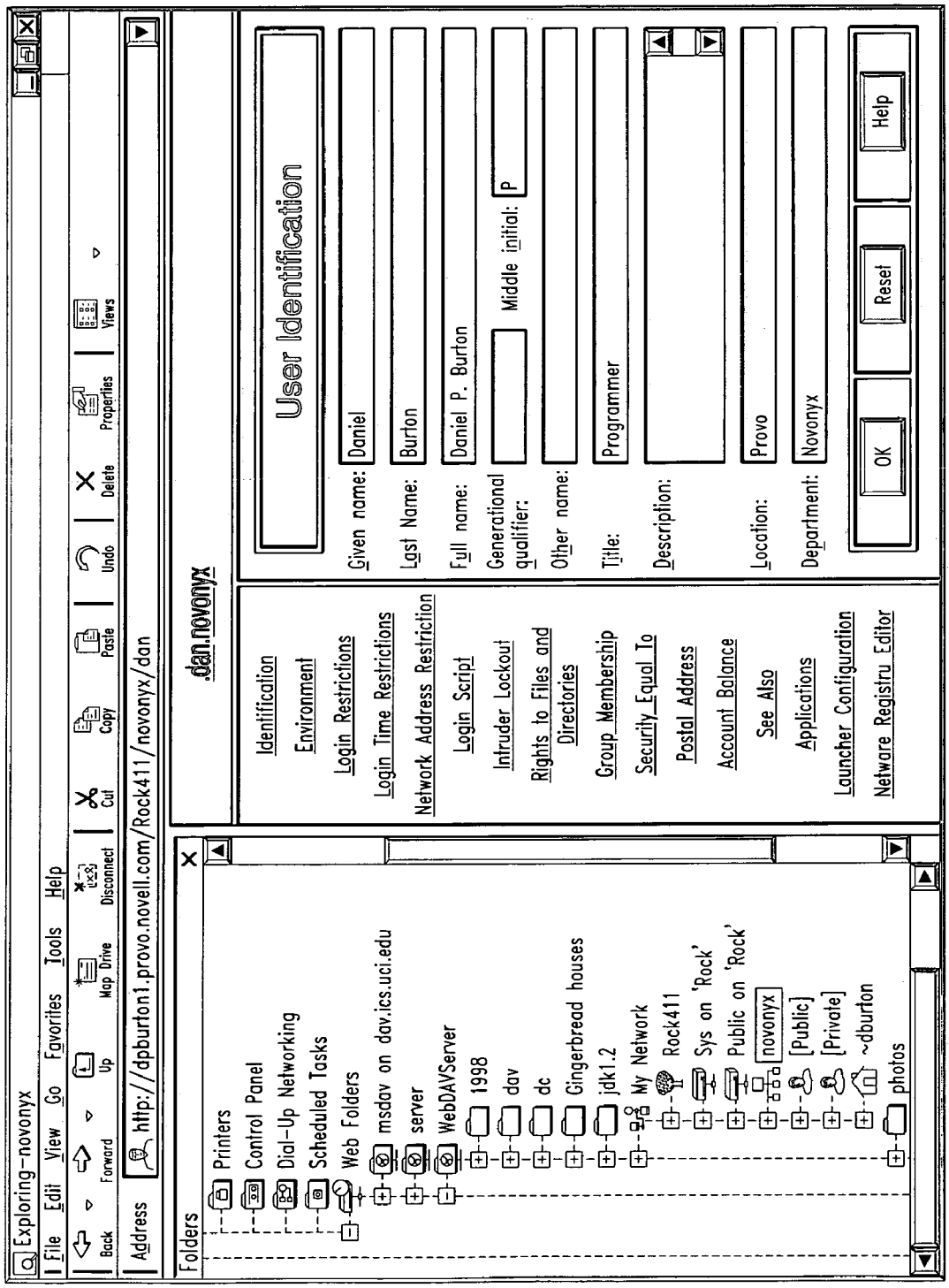
FIG. 3 is another example computer screen that further illustrates the example in FIG. 2.

FIG. 3 shows another screen 44 with the details of the Dan object listed in window 45. The window 45 allows editing of the User Identification of the Dan object, as well as the other object attributes listed in context menu 44. Moreover, the text and fields shown in window 42 and context menu 44 can be easily modified as will be explained in detail below.

In order to better understand the preferred embodiment, a few terms will now be defined. Methods are the methods specified in the http header of a request. Routines are the code that performs the necessary actions to handle a method request. Properties are the names and values from the prop and other property elements in a eXtensible Markup Language (XML) document. Attributes are the NDS equivalents to properties that are used in the NDS Application Programming Interface (API) calls.

Figure 4:
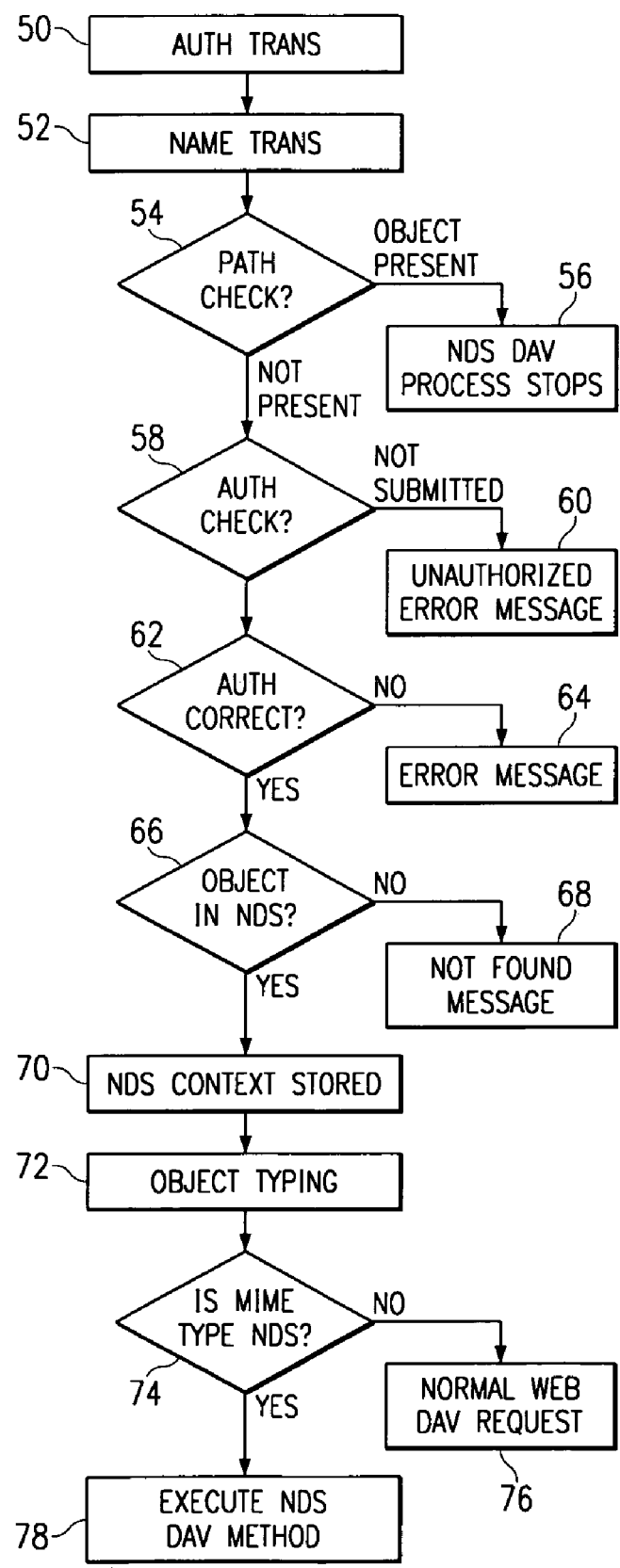
FIG. 4 is a flow chart of the preferred embodiment.

Now referring to FIG. 4, the first step, Authorization Translation (AuthTrans) 50, verifies any authorization information. NDS DAV does not alter this step. Then, the Name Translation (NameTrans) 52 translates a logical URL to a local file system path. NDS DAV does not alter this step either. The process then performs Path Checking (Path-Check) 54 which checks the local file system for validity and approved access by the requesting user. At this step, NDS DAV first checks to see if the requested object is in the file system. If the requested object is in the file system, than normal processing is allowed to continue and NDS DAV takes no further actions 56.

NDS DAV next checks to see that authorization credentials (auth-user and auth-password in the request variables) have been submitted 58. If the authorization credentials have not been submitted, then the process returns a 401 Unauthorized error message 60. If the credentials are present, the process authenticates to NDS with the name and password in step 62. If the authorization is incorrect, the process then returns an error message in step 64 and stops. Otherwise, upon successful authentication, the process then checks for the requested object in NDS 66; if the object is not found (this could be because the user does not have rights to see this object) a 404 Not Found message 68 is returned and the process is stopped. If the object is found, the NDS context used in the authenticating process is stored in the session structure passed to NDS DAV from the web server.

The process now determines the MIME-type of the requested resource at the Object Typing (ObjectType) step 72. In this step, NDS DAV checks for the presence of the NDS context in the session structure. If the NDS context is found, the MIME type is set to ndsdav/nds.

The Service step 74 returns the response to the client. If the MIME type is not ndsdav/nds, then the request is processed as a normal WebDAV request in step 76 and NDS DAV takes no further actions. If the request is for NDS, NDS DAV checks for the method and processes it in step 78 as described in the following text.

The PROPFIND routine checks to see which properties are requested. If specific properties are requested, those properties are placed in an NDS input buffer using the NWDSPutAttribute API. After all of the attributes are in the buffer, NWDSRead is called to retrieve the NDS attributes. If ALLPROPS has been specified or if no properties have been specified, the allAttrs parameter for the NWDSRead is set to true to return all of the properties of the object. On successfully reading the attributes of an object, the NWDSGetAttrName and NWDSGetAttrValue APIs are called to retrieve the attributes in step 84. These attributes are converted to XML using the XML element definitions defined below and put in the XML document that is returned upon competition of the PROPFIND routine handling. The PROPFIND routine then checks to see if the object is a container, and if it is, it checks to see if a non zero depth has been requested. If these are true, it checks to see if the depth is 1; if the depth is 1, it sets the depth to 0. The PROPFIND routine is recursively called for each object in the container.

The PROPPATCH routine parses the XML document to obtain the attributes to set. The NWDSModifyObject step then applies the attribute changes. When a PROPPATCH routine is sent, the PROPPATCH routine gets the XML document and sets the attributes in an NDS input buffer, using the NWDSPutAttrNameAndValue call. If there is a named by property in the XML document, the property specified by the named by property is not put in the NDS input buffer. After all of the properties have been put in the input buffer, the attributes are set in NDS by calling the NWDSModifyObject API.

Because the name of an object in the NDS scheme is specified as one of the attributes, it is possible to change the name of the object with the PROPPATCH routine. However, NDS uses a different API to change the attributes that are used to name the object. Accordingly, the PROPPATCH routine handler needs to know what the Named By attribute of the object is. When the base class of the object is Organization, the Named By attribute is assumed to be O. When the base class is Organizational Unit, the Named By attribute is assumed to be OU. For all other classes, in order to change the attribute that is used as the Name of the object, a Named By property must be specified. If this property is not specified, then it is assumed that the Object Name is not being changed. If the PROPPATCH routine tries to change the property that corresponds to the NDS attribute that is used to Name the object and a Named By property is not specified a, 409 Conflict is returned.

PROPPATCH can be used to change the Password for an Object. Although the Password is not an NDS attribute, the PROPPATCH routine looks for an Object Password property in the XML doc. If this property is sent, then the process looks for Object Old Password. If the Object Old Password property is not found, then the old password is assumed to be an empty string. The PROPPATCH routine then calls the NDSChangeObjectPassword to change the password of the object.

The MKCOL routine checks for an XML doc. If the document is not there, the routine assumes that the class exists and checks the class of the parent object. If the parent object is an Organization, Organizational Unit, or a Locality, the routine creates a new Organizational Unit. If the parent is a Country, or Top, the routine creates a new Organization. If the parent class is not an Organization, Organizational Unit, Locality, Country, or Top, the routine returns an error 403 Forbidden.

If the XML document exists, the document is parsed and the properties are applied to the new object. NDS DAV then checks for an Object Class property. If the Object Class property does not exist, then the same rules are used as when no XML document is present. When the Object Class property is found, the new object is created with the Object Class set according to the Object Class property. NDS objects may also have other mandatory attributes. If those mandatory attributes do not exist in the XML document, then the NWDSAddObject returns an error and NDS DAV returns a 403 Forbidden. For objects of base class Organization it is assumed that the name of the collection should be used for the O attribute in NDS. For Organizational Units the collection name is used for the OU attribute. For all other base classes it is expected that a Named By property be set that specifies which attribute is used for the name of the collection. If the Named By property is not in the XML document, a 403 Forbidden is returned.

EXAMPLE

MKCOL

>>Request
    MKCOL/Tree/CZ HTTP1.1
    Host: www.foo.bar
    Content-Type: text/xml; cjarset="utf-8"
    Content-Length: xxx
    <?xml version="1.0" encoding="utf-8"?>
    <set xmlns="NDSDAV:" xmlns:DS="NDSDAV">
        <DS:NamedBy>C</DS :NamedBy>
        <prop>
            <DS:ObjectClass>Country</DS:ObjectClass>
        </prop>
    </set>
>>Response HTTP/1.1 201 Created In the example above, a Country object named CZ is created in the root of the tree named Tree. The attribute C, which is used to name Country objects, is set to CZ.

The DELETE routine is recursively called, based on the requested depth. The DELETE routine simply calls the NWDSRemoveObject API to remove each object.

The GET method is not changed in the WebDAV specification. However, GET needs to be defined for NDS objects. When a GET method is received, NDS DAV looks for the object. If NDS DAV finds the object, the base class of the object is retrieved using the NWDSReadObjectInfo API. The routine searches a configuration directory for an HTML template file that is named by the base class with an appended. HTML extension (i.e. User.HTML). If this file is found, it is parsed looking for HTML comments where the text in the comment starts with NDS. When an NDS comment is found, it is replaced with data from the NDS object using the NDS Template File Parsing rules. The resulting document is then sent as the reply for the GET method.

If an HTML template file is not found, the attributes of the object are read using the NWDSRead API and returned as HTML using the Forms for NDS Attributes rules. The HTML format allows the object to be viewed and modified using a web browser.

The POST method is not changed by the WebDAV specifications. For NDS objects, NDS DAV parses the contents of the request for NDS attributes using the Forms for NDS Attributes rules.

The ASSIGN-TRUSTEE method is not defined by the WebDAV specification. When an ASSIGN-TRUSTEE method is received, NDS DAV looks for an XML document to determine what rights should be assigned. In the absence of an XML document, NDS DAV retrieves the default rights from the NDS DAV configuration. Browse, Add, Delete, Rename, Supervisor, Read, Write, Create, and Modify are valid XML elements for ASSIGN-TRUSTEE. However, not all rights apply to all objects. If a right is specified on an object that is not valid for that object, the invalid right is ignored. Ignoring invalid rights allows use of the default rights for both NDS objects and File System objects.

|  | NDS | File System |
| --- | --- | --- |
| Browse | X | X |
| Add | X |  |
| Delete | X | X |
| Rename | X |  |
| Supervisor | X | X |
| Read |  | X |
| Write |  | X |
| Create |  | X |
| Modify |  | X |

The MOVE method request will now be described. Since the ability to assign an object as a trustee of another object by dragging and dropping an NDS object on another object would be advantageous, the MOVE method request is handled as an ASSIGN-TRUSTEE method request unless an "ASSIGN-TRUSTEE: False" header is found. However, another implementation could have the MOVE method request be a true MOVE and just use the ASSIGN-TRUSTEE method request to assign trustees. When an "ASSIGN-TRUSTEE: False" header is found, the MOVE method request attempts to move the object. If the object is a container, all of the child objects are also moved to the container specified in the Destination: header.

Because the MOVE method request does not default to a normal MOVE behavior, COPY can also be used to perform a MOVE. NDS DAV looks for a "PERFORM-MOVE: True" header. If it is found, the COPY routine is handled as a move. The COPY routine checks for a "Link: True" header. If it is found, an Alias is created for the object in the destination directory.

The LOCK and UNLOCK method are not used for NDS DAV if these routines are requested on an NDS object, a 403 Forbidden is returned.

Because all modifications for an NDS object can be accomplished using the PROPPATCH method, the PUT routine returns a 403 Forbidden for existing objects. However, if the PUT method request is sent for an object that does not exist, a new object is created. The PUT routine looks for an XML document in the body of the message. The XML document should describe the properties for the new document using the XML Elements Definitions below.

EXAMPLE

PUT

```
>>Request
    PUT/Rock/Gentoo/Stephan HTTP/1.1
    Host: www.foo.bar
    Content-Type: text/xml; cjarset="utf-8"
    Content-Length: xxx
    <?xml version="1.0" encoding="utf-8"?>
    <set xmlns="NDSDAV:" xmlns:DS "NDSDAV">
        <DS:NamedBy>CN</DS:NamedBy>
        <prop>
            <DS:ObjectClass>User</DS:ObjectClass>
        </prop>
        <prop>
            <DS:Surname>
                <DS:CaseIgnore>Burton</DS:CaseIgnore>
            </DS:Surname>
        </prop>
    </set>
>>Response
    HTTP/1.1 201 Created
```

In the example above, a new User object named Stephan will be created in the Organization named Gentoo and the tree named Rock. The attribute Surname will be set to Burton. The attribute CN, which is used to name the object, will be set to Stephan.

NDS Template File Parsing

NDS DAV uses template files to create HTML representations of NDS objects. A template processor replaces the contents of NDS comments with data from NDS. NDS comments are in the format: <!--NDS:function: parameters-->. The NDS comments are defined below. New comments can be added using the same format.

When the current object is in the file system, the associated NDS object is the NDS object of the Volume where the file system object resides.

DNLink
<!-- NDS:DNLink --> Outputs the distinguished name of the NDS object as a series of links that can be used to browse any container in the objects hierarchy.

DN
<!-- NDS:DN --> Replaced with the current NDS object's fully distinguished name.

EscDN
<!—NDS:EscDN --> Replaced by the MIME encoded fully distinguished name of the current NDS object.

EscPath
<!—NDS:EscPath --> When the current object is in the file system, this is replaced with the MIME encoded path of the object.

EscBaseClass
<!—NDS:EscBaseClass --> Replaced with the base class of the current NDS object.

EscParentDN
<!—NDS:EscParentDN --> Replaced with the MIME encoded name of the container that the current NDS object is in.

DN
<!—NDS:EscDN --> Replaced by the fully distinguished name of the current NDS object.

Path
<!—NDS:EscPath --> When the current object is in the file system, this is replaced with the path of the object.

BaseClass
<!—NDS:EscBaseClass --> Replaced with the base class of the current NDS object.

ParentDN
<!—NDS:EscParentDN --> Replaced with the name of the container that the current NDS object is in.

File
<!—NDS:File:filename --> The file "filename" is opened and parsed.

Attribute
<!-- NDS:Attribute:AttributeName:SyntaxPart --> Gets the "Attribute" attribute from the current object. If the Syntax of the attribute contains multiple parts "Syntax Part" specifies which parts will be returned.

TreeName
<!—NDS:TreeName --> Replaced with the name of the tree the current NDS Object is in.

Forms for NDS Attributes

When processing the form data for a post, NDS DAV looks for variables with names of the format NDS_Attribute_AttributeName. For attribute names, all spaces are replaced by the "_" character. For attribute syntaxes that have multiple fields, "_Field_" is appended to the variable name followed by the field name. So for syntaxes with files, the variable name has the format NDS_Attribute_AttributeName_Field_FieldName.

EXAMPLE

The NetWare Software Developer's Kit defines the API data structure Path_T, which is used for the path syntax, as:
typedef enum
{
    DS_DOS,
    DS_MACINTOSH,
    DS_UNIX,
    DS_FTAM,
    DS_OS2
} NAME_SPACE_TYPE;

The default HTML created when no template file exists for a Home Directory attribute that represents the path SYS:/novonyx/suitespot/docs in the long namespace would be:
    <input type="text"
    name="NDS_Attribute_Home_Directory_Field_
        NameSpaceType"
    value="4"><br>
    <input type="text"
    name="NDS_Attribute_Home_Directory_Field_
        VolumeName"
    value="SYS"><br>
    <input type="text" name="NDS_Attribute_Home_
        Directory_Field_path"
    value="novonyx/suitespot/docs"><br>

Template files can be used to create customized looks. For instance, the nameSpaceType could be included in a template file using the following, which would present it as a drop down box instead of a text box.

```
<Script> namespace =<!-- NDS:Attribute:Home Directo-
   ry:nameSoaceType --></Script>
<select    name="NDS_Attribute_Home_Directory_
   Field_NameSpaceType">
<option    value="0"    &{(if    namespace    ==0)
   {"selected"}};> DOS
<option    value="1"    &{(if    namespace    ==1)
   {"selected"}};> Mac
<option    value="2"    &{(if    namespace    ==2)
   {"selected"}};> UNIX
<option    value="3"    &{(if    namespace    ==3)
   {"selected"}};> FTAM
<option    value="4"    &{(if    namespace    ==4)
   {"selected"}};> Long
</select>
```

These features of the invention facilitate the customization of the context menu 46 and the window 45 of FIG. 3.

XML Element Definitions

Definition of the NDSDAV: Namespace

To restrict the values allowed in a PCDATA element, the following are used where PCDATA would normally be used:
   uint8 indicates that valid values are unsigned numeric values that can be represented in 8 bits (i.e. between 0 and 255).
   uint16 indicates that valid values are unsigned numeric values that can be represented in 16 bits.
   uint32 indicates that valid values are unsigned numeric values that can be represented in 32 bits.
   int32 indicates that valid values are signed numeric values that can be represented in 32 bits.
   All of the numeric values can be represented in hex if they are preceded by a 0x (i.e. 0xFF)

Address
<!ELEMENT Address (#PCDATA)>

Address Hint
<!ELEMENT AddressHint (NetAddress)>

Address Type
<!ELEMENT AddressType (#PCDATA) -- Valid values for PCDATA are: "IPX"|"IP"|"SDLC"|"TokenRing"|"OSI"|"AppleTalk"|"Count" -->

Amount
<!ELEMENT Amount (uint32)>

Attribute Name
<!ELEMENT AttributeName (#PCDATA)>

Back Link
<!ELEMENT BackLink (RemoteID, ObjectName)>

Bit String
<!ELEMENT BitString (uint8+)>

Boolean
<!ELEMENT Boolean (#PCDATA) -- Valid values for PCDATA are "True"|"False"--≧

Case Exact String
<!ELEMENT CaseExact (#PCDATA)>

Case Ignore List
<!ELEMENT CaseIgnoreList (CaseIgnore+)>

Case Ignore String
<!ELEMENT CaseIgnore (#PCDATA)>

Class Name
<!ELEMENT ClassName (#PCDATA)>

Count
<!ELEMENT Count (uint32)>

Counter
<!ELEMENT Counter (uint32)>

Distinguished Name
<!ELEMENT DistinguishedName (#PCDATA)>

EMail Address
<!ELEMENT EMail Address (EmailType, Address)>

Email Type
<!ELEMENT EmailType (uint32)>

Event ID
<!ELEMENT Event ID (uint32)>

Facsimile Telephone Number
<!ELEMENT FaxNumber (TelephoneNumber, BitString)>

Hold
<!ELEMENT Hold (ObjectName, Amount)>

Integer
<!ELEMENT Integer (int32)>

Interval
<!ELEMENT Interval (int32)>

Level
<!ELEMENT Level (uint32)>

Line
<!ELEMENT Line (#PCDATA)>

Name Space
<!ELEMENT NameSpace (#PCDATA) -- Valid values for PCDATA are: "DOS"|"Macintosh"|"UNIX"|"FTAM"|"Long"-->

Net Address
<!ELEMENT NetAddress (AddressType, Address)

Numeric String
<!ELEMENT NumericString (#PCDATA) -- Valid values for PCDATA are the digits 0..9 and the space character.-->

Object ACL
<!ELEMENT ObjectACL (ProtectedName, SubjectName, Privileges)>

Object Name
<!ELEMENT ObjectName (#PCDATA)>

Octet List
<!ELEMENT Octet List (OctetString+)>

Octet String
<!ELEMENT OctetString (uint8*)>

Path
<!ELEMENT Path (NameSpace, Volume, PathName)>

Path Name
<!ELEMENT PathName (#PCDATA)>

Postal Address (Syntax)
<!ELEMENT PostalAddress (Line*) -- a maximum of six lines will be used-->

Printable String
<!ELEMENT PrintableString (#PCDATA)>

Privileges
<!ELEMENT Privileges (#PCDATA*) -- Valid values for PCDATA are: "Browse"|"Add"|"Delete"|"Rename"| "Supervisor"|"Read"|"Write"|"Create"|"Modify" -->

Protected Name
<!ELEMENT ProtectedName (#PCDATA)>

Remote ID
<!ELEMENT RemoteID (uint32)>

Replica Number
<!ELEMENT ReplicaNumber (uint32)>

Replica Pointer
<!ELEMENT ReplicaPointer (ServerName, ReplicaType, ReplicaNumber, Count, AddressHint)>

Replica Type
<!ELEMENT ReplicaType (#PCDATA) -- Valid values for PCDATA are: "Master"|"Secondary"|"Read-Only" -->

Server Name
<!ELEMENT ServerName (#PCDATA)>

Stream
<!ELEMENT Stream (#PCDATA)>

Subject Name
<!ELEMENT SubjectName (#PCDATA)>

Syntax ID
<!ELEMENT SyntaxID (uint32)>

Telephone Number
<!ELEMENT TelephoneNumber (#PCDATA)>

Time
<!ELEMENT Time (Uint32) --seconds past Jan. 1, 1970 -->

Timestamp
<!ELEMENT TimeStamp (Time, EventID)>

Typed Name
<!ELEMENT TypedName (ObjectName, Level, Interval)>

Unknown
<!ELEMENT UnknownSyntax (AttributeName, SyntaxID, Value)>

Value
<!ELEMENT Value (uint8*)>

Volume
<!ELEMENT Volume (#PCDATA)>

It is understood that several modifications, changes and substitutions are intended in the foregoing disclosure and in some instances some features of the invention will be employed without a corresponding use of other features. For example, although the present invention was discussed using an I/O card, it may be employed on virtually any electronic device. Accordingly, it is appropriate that the appended claims be construed broadly and in a manner consistent with the scope of the invention.

What is claimed is:

1. A method for manipulating network objects by extending an Internet authoring, collaboration and versioning protocol to a network directory service having network administration functions, wherein the protocol allows a user to perform remote web content authoring and user rights administration operations, the method comprising:

receiving a request using the Internet authoring, collaboration and versioning protocol for a manipulation of a first network object from a requesting user, wherein the first network object includes at least one from the group consisting of: devices, resources and container objects;

verifying a first set of authorization information;

translating a logical object address to a physical file system path;

checking a file system for validity and authorization for the requesting user including determining whether the first network object is a network object within the network directory service;

verifying a username and a password for the requesting user;

returning a first error message if requesting user is unauthorized to access the first network object;

determining an object type for the first network object;

sending a response to the requesting user;

accessing the network administration functions of the network directory service using the Internet authoring, collaboration and versioning protocol; and administering user rights to the first network object using the Internet authoring, collaboration and versioning protocol, wherein the administration of the user rights is allowed without requiring client software, related to the network directory service, installed on a user workstation.

2. The method of claim 1 wherein the manipulation of the first network object includes changing a set of attributes of the first network object.

3. The method of claim 1 further including verifying that the first network object is found.

4. The method of claim 3 further including returning a second error message if the first network object is not found.

5. The method of claim 1 further including assigning new rights to the first network object.

6. The method of claim 5 wherein the new rights for the first network object are for a second network object.

7. The method of claim 5 wherein the new rights are assigned by dragging and dropping a second network object on the first network object by the use of an interactive computer screen.

8. The method of claim 7 wherein the new rights are all rights for all users and assigned by dragging a public icon and dropping the public icon on the first network object.

9. The method of claim 7 wherein the new rights are subtracting all rights for all users except an assigned user to the first network object and wherein the new rights are assigned by dragging a private icon and dropping the private icon on the first network object.

10. The method of claim 1 further including modifying a set of attributes of the first network object by modifying a set of fields on a screen of a subset of the set of attributes.

11. The method of claim 10 further including navigating a context menu for a plurality of screens that allow modification of the set of attributes of the first network object.

12. A computer program for manipulating network objects by extending an Internet authoring, collaboration and versioning protocol to a network directory service having network administration functions, wherein the protocol allows a user to perform remote web content authoring and user rights administration operations, the computer program comprising:

instructions for receiving a request using the Internet authoring, collaboration and versioning protocol for a manipulation of a first network object from a requesting user, wherein the first network object includes at least one from the group consisting of: devices, resources and container objects;

instructions for verifying a first set of authorization information;

instructions for translating a logical Uniform Resource Locator to a local file system path;

instructions for checking a local file system for validity and authorization for the requesting user including determining whether the first network object is a network object within the network directory service;

instructions for verifying a username and a password for the requesting user;

instructions for returning a first error message if requesting user is unauthorized to access the first network object;

instructions for determining an object type for the first network object;

instructions for sending a response to the requesting user;

instructions for accessing the network administration functions of the network directory service using the Internet authoring, collaboration and versioning protocol, and instructions for administering user rights to the first network object using the Internet authoring, collaboration and versioning protocol, wherein the administration of the user rights is allowed without requiring client software, related to the network directory service, installed on a user workstation.

13. The computer program of claim 12 further including instructions for verifying that the first network object is found.

14. The computer program of claim 13 further including instructions for returning a second error message if the first network object is not found.

15. The computer program of claim 12 wherein the request is to assign new rights to the first network object.

16. The computer program of claim 15 wherein the new rights for the first network object are for a second network object.

17. The computer program of claim 15 wherein the new rights are assigned by dragging and dropping a second network object on the first network object by the use of interactive computer screen.

18. The computer program of claim 17 wherein the new rights are all rights for all users and assigned by dragging a public icon and dropping the public icon on the first network object.

19. The computer program of claim 17 wherein the new rights are subtracting all rights for all users except an assigned user to the first network object and wherein the new rights are assigned by dragging a private icon and dropping the private icon on the first network object.

20. The computer program of claim 12 further including instructions for modifying a set of attributes of the first network object by modifying a set of fields on a screen of a subset of the set of attributes.

21. The computer program of claim 20 further including instructions for navigating a context menu for a plurality of screens that allow modification of the set of attributes of the first network object.

22. The computer program of claim 12 wherein the manipulation of the first network object includes instructions for changing a set of attributes of the first network object.

23. A system for manipulating network objects by extending an Internet authoring, collaboration and protocol to a network directory service having network administration functions, wherein the protocol allows a user to perform remote web content authoring and user rights administration operations, the system comprising:

a web server;

a work station connected to the web server by an Internet connection;

at least one network server connected to the web server;

at least one storage system connected to the web server;

means for receiving a request using the Internet authoring, collaboration and versioning protocol for a manipulation of a first network object from the work station, wherein the first network object includes at least one from the group consisting of: devices, resources and container objects;

means for verifying a first set of authorization information;

means for translating a logical Uniform Resource Locator to the storage system;

means for checking for validity and authorization for a requesting user including determining whether the first network object is a network object within the network directory service;

means for verifying a username and a password for the requesting user;

means for determining an object type for the first network object;

means for sending a response to the requesting user;

means for accessing the network administration functions of the network directory service using the Internet authoring, collaboration and versioning protocol; and means for administering user rights to the first network object using the Internet authoring, collaboration and versioning protocol, wherein the administration of the user rights is allowed without requiring client software, related to the network directory service, installed on a user workstation.

24. The system of claim 23 further including means for verifying that the first network object is found.

25. The system of claim 24 further including means for returning a second error message if the first network object is not found.

26. The system of claim 23 wherein the request is to assign new rights to the first network object.

27. The system of claim 26 wherein the new rights for the user are for a second network object.

28. The system of claim 27 wherein the new rights are all rights for all users and assigned by dragging a public icon and dropping the public icon on the first network object.

29. The system of claim 27 wherein the new rights are subtracting all rights for all users except an assigned user to the first network object and wherein the new rights are assigned by dragging a private icon and dropping the private icon on the first network object.

30. The system of claim 26 wherein the new rights are assigned by dragging and dropping a second network object on the first network object by the use of interactive computer screen.

31. The system of claim 23 further including means for modifying a set of attributes of the first network object by modifying a set of fields on a screen of a subset of the set of attributes.

32. The system of claim 31 further including means for navigating a context menu for a plurality of screens that allow modification of the set of attributes of the first network object.

33. The system of claim 23 wherein the manipulation of the first network object includes means for changing a set of attributes of the first network object.

34. A method for manipulating network objects by extending an Internet authoring, collaboration and versioning protocol to a network directory service having network administration functions, wherein the protocol allows a user to perform remote web content authoring and user rights administration operations, the method comprising:

- receiving a request using the Internet authoring, collaboration and versioning protocol for a manipulation of a first network object from a requesting user, wherein the first network object includes at least one from the group consisting of: devices, resources and container objects;
- verifying a first set of authorization information;
- translating a logical object address to a physical file system path;
- checking a file system for validity and authorization for the requesting user including determining whether the first network object is a network object within the network directory service;
- verifying a username and a password for the requesting user;
- returning a first error message if requesting user is unauthorized to access the first network object;
- determining an object type for the first network object;
- sending a response to the requesting user;
- accessing the network administration functions of the network directory service using the Internet authoring, collaboration and versioning protocol; and
- navigating a context menu for a plurality of screens that allow modification of the set of attributes of the first network object;
- modifying a set of attributes of the first network object by modifying a set of fields on a screen of a subset of the set of attributes; and
- administering user rights to the first network object using the Internet authoring, collaboration and versioning protocol, wherein the administration of the user rights is allowed without requiring client software, related to the network directory service, installed on a user workstation.

35. The method of claim 34 wherein the request is to assign new rights to the first network object.

36. The method of claim 35 wherein the new rights for the first network object are for a second network object.

37. The method of claim 35 wherein the new rights are assigned by dragging and dropping a second network object on the first network object by the use of interactive computer screen.

38. The method of claim 37 wherein the new rights are all rights for all users and assigned by dragging a public icon and dropping the public icon on the first network object.

39. The method of claim 37 wherein the new rights are subtracting all rights for all users except an assigned user to the first network object and wherein the new rights are assigned by dragging a private icon and dropping the private icon on the first network object.

40. A computer network for a plurality of users to access a workplace by using an Internet authoring, collaboration and versioning protocol, wherein the protocol allows a user to perform remote web content authoring and user rights administration operations, the system comprising:

- a plurality of network computer servers within the computer network;
- a plurality of network computer workstations within the computer network and connected to at least one of the plurality of network computer servers;
- a file system, network directory, and printing subsystem on the computer network and accessible by the plurality of users by the protocol;
- a security system that provides an authentication process in order to allow access to the plurality of users to the file system, network directory, and printing subsystem; and
- a graphical user interface using the Internet authoring, collaboration and versioning protocol for viewing the file system, network directory and printing subsystem as the workplace, and providing the plurality of users the ability to manipulate the file system, network directory and printing subsystem and the ability to run a plurality of network applications within the file system and network directory portions of the subsystem wherein user rights to the file system, network directory, and printing subsystem are administered using the Internet authoring, collaboration and versioning protocol, wherein the administration of the user rights is allowed without requiring client software, related to the administration of the user rights, on a user workstation.

41. The computer network of claim 40 wherein the computer network is a global internet network and the file and directory subsystem is within an intranet network.

42. The computer network of claim 40 wherein the graphical user interface is a web browse.

* * * * *